United States Patent
Smith, Jr. et al.

(10) Patent No.: US 7,664,459 B2
(45) Date of Patent: Feb. 16, 2010

(54) ON-BOARD MESSAGE REPEATER FOR RAILROAD TRAIN COMMUNICATIONS SYSTEM

(75) Inventors: Eugene A. Smith, Jr., Satellite Beach, FL (US); David Michael Peltz, Melbourne, FL (US); Robert C. Palanti, Melbourne, FL (US)

(73) Assignee: General Electric Co., Schenectady, NY (US)

( * ) Notice: Subject to any disclaimer, the term of this patent is extended or adjusted under 35 U.S.C. 154(b) by 787 days.

(21) Appl. No.: 11/088,090

(22) Filed: Mar. 23, 2005

(65) Prior Publication Data

US 2006/0085103 A1    Apr. 20, 2006

Related U.S. Application Data

(60) Provisional application No. 60/565,591, filed on Apr. 26, 2004.

(51) Int. Cl.
*H04B 3/36* (2006.01)
(52) U.S. Cl. .................... 455/7; 455/11.1; 370/315; 246/167 R; 701/20
(58) Field of Classification Search ............ 455/7–11.1, 455/18, 24; 340/298; 701/19–20; 370/315; 246/166.1–173
See application file for complete search history.

(56) References Cited

U.S. PATENT DOCUMENTS

| | | | |
|---|---|---|---|
| 4,553,723 A | 11/1985 | Nichols et al. | |
| 4,582,280 A | 4/1986 | Nichols et al. | |
| 5,039,038 A | 8/1991 | Nichols et al. | |
| 5,681,015 A | 10/1997 | Kull | |
| 5,720,455 A * | 2/1998 | Kull et al. ............. | 246/187 C |
| 6,400,281 B1 | 6/2002 | Darby, Jr. et al. | |
| 6,862,502 B2 | 3/2005 | Peltz et al. | |

(Continued)

OTHER PUBLICATIONS

Hoerl, F. et al., "Multiple Radio Remote Control of Locomotives in Coupled Trains," Elektrische Bahnen, Oldenbourg Industrieverlag, Munchen, DE, vol. 100, No. 3, Mar. 2002, pp. 105-109, XP001101506, ISSN: 0013-5437.

(Continued)

*Primary Examiner*—Raymond S Dean
(74) *Attorney, Agent, or Firm*—Robert Waurzyn, Esq.; John L. DeAngelis, Esq.; Beusse Wolter Sanks Mora & Maire, P.A.

(57) ABSTRACT

A distributed power train (10) communications system for sending and receiving signals between a lead locomotive (14) and remote locomotives (12A/12B/12C) in the train (10). A lead (14) initiated message is received by at least the remote locomotive (12A/12B) nearest to the lead unit (14). The receiving remote unit (12A/12B) retransmits the message for receiving by the next remote unit (12C) in the train. Thus the message leapfrogs down the train from the lead unit (14) to the remote units (12A/12B/12C). When the last remote unit (the nth remote unit) (12C) receives the message, the last remote (12C) transmits a status or other response message to the lead unit's message. The status message is received at the (n-1)th remote unit (12A/12B), which appends its status message and transmits the combined status messages toward the lead unit (14). Each successive remote unit receives the status messages of the other remote units and appends its status message, until the concatenated status message reaches the lead unit (14).

18 Claims, 10 Drawing Sheets

U.S. PATENT DOCUMENTS

2002/0027495 A1* 3/2002 Darby et al. ............... 340/298
2002/0107616 A1 8/2002 Delaruelle

OTHER PUBLICATIONS

Schaefers, C. et al., "IEC 61375-1 and UIC 556- International Standards for Train Communication," VTC 2000- Spring 2000, IEEE 51st Vehicular Technology Conference Proceedings, Tokyo, Japan, May 15-18, 2000, IEEE Vehicular Technology Conference, New York, NY, IEEE, US, vol. vol. 2 of 3, Conf. 51, May 15, 2000, pp. 1581-1585, XP000968137, ISBN: 0-7803-5719-1.

Blum D. et al., "Ein Kommunikationsstandard Fuer Schienenfahrzeuge" (Translation: "A Communications Standard for Railroad Trains"), Automatisierungstechnische Praxis-ATP, Oldenbourg Industrieverlag, Munchen, DE, vol. 38, No. 6, Jun. 1, 1996, pp. 33-40, XP000592680, ISSN: 0178-2320.

Kurz H.R., "Zugsteuerung MIT Lichtwellenleiter-Datenubertragung fur die Triebzuge Intercity-Express" (Translation: "Train Control System with Fiber Optic Data Transfer for the ICE Trainset"), Elektrische Bahnen, Oldenbourg Industrieverlag, Munchen, DE, vol. 87, No. 5, May 1, 1989, pp. 129-134, XP000030209, ISSN: 0013-5437.

EPO Communication Under Rule 112 EPC and Search Report, dated Mar. 28, 2007.

PCT International Preliminary Search Report on Patentability, dated Jun. 27, 2006.

PCT International Search Report, dated Mar. 7, 2006.

PCT Written Opinion of the International Searching Authority, Mar. 13, 2006.

* cited by examiner

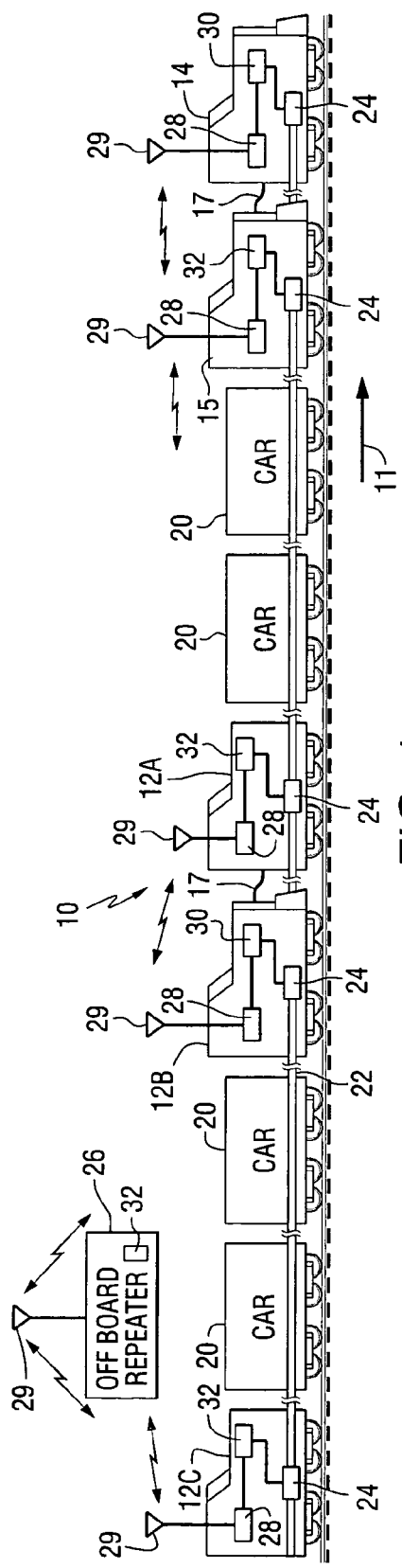
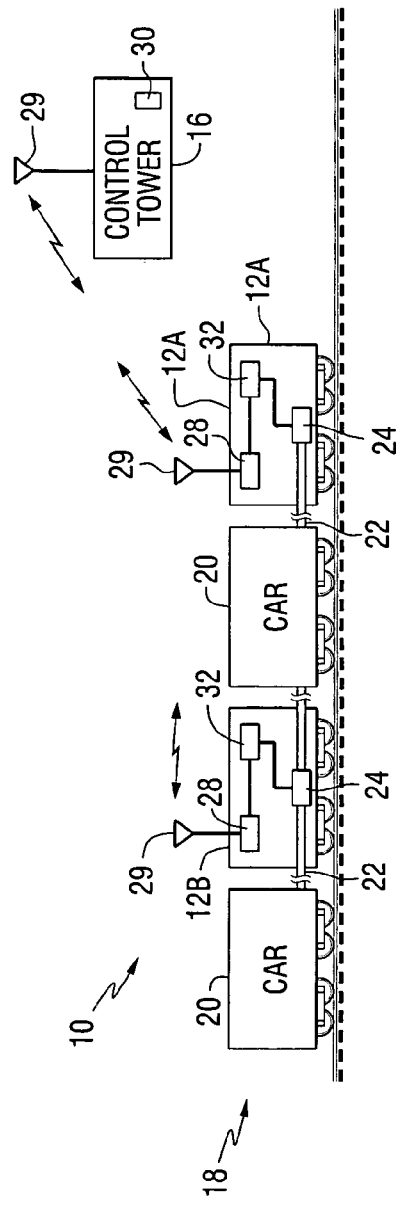
FIG. 1
FIG. 2

| Unit | Priority Time | Time Delay | Message Content |
|---|---|---|---|
| Lead | --- | --- | Cmd |
| Remote 1 | N x 50 msec | 50 msec | Cmd |
| Remote 2 | N x 50 msec | 100 msec | Cmd |
| Remote 3 | N x 50 msec | 150 msec | Cmd |
| Remote 4 | N x 50 msec | 200 msec | Status (R4) |
| Remote 3 | (M + 1) x 50 msec | 250 msec | Status (R3 + R4) |
| Remote 2 | (M + 2) x 50 msec | 300 msec | Status (R2 + R3 + R4) |
| Remote 1 | (M + 3) x 50 msec | 350 msec | Status (R1 + R2 + R3 + R4) |

N = Remote Number
M = Number of Remotes

FIG. 5

| Message Protocol Type | Time to get Command Message to all Remotes | Time to get Status Message from all Remotes Back to Lead |
|---|---|---|
| Normal LOCOTROL Message Protocol | 0.848 sec (0.223 sec) | 2.896 sec (2.271 sec) |
| On-Board Message Repeater Protocol | 1.667 sec (1.042 sec) | 4.377 sec (3.752 sec) |
| Standard Off-Board Message Repeater Protocol | 1.422 sec (0.797 sec) | 4.034 sec (3.409 sec) |

NOTE: All times include 0.625 seconds to allow priority timing from last received End of Message. Actual times based on start of lead transmit are shown in parenthesis.

*FIG. 9*

ON-BOARD MESSAGE REPEATER FOR RAILROAD TRAIN COMMUNICATIONS SYSTEM

This patent application claims the benefit of U.S. Provisional Patent Application No. 60/565,591 filed on Apr. 26, 2004.

FIELD OF THE INVENTION

This invention relates generally to railroad train communications systems and particularly to an on-board message repeater for railroad train communications systems for use with a distributed power train comprising a lead locomotive and one or more remote locomotives.

BACKGROUND OF THE INVENTION

Distributed power railroad train operation supplies motive power and braking action from a lead locomotive (or lead unit) and one or more remote locomotives (or remote units) spaced apart from the lead unit in a train. In one configuration, a distributed power train comprises a lead locomotive at a head end of the train, a remote locomotive at an end of train (EOT) position and one or more mid-train locomotives disposed between the head end and the end of train. Distributed train operation may be preferable for long train consists to improve train handling and performance, and especially for trains operating over mountainous terrain.

In a distributed power train, each lead and remote locomotive supplies motive power and braking action for the train. Motive and braking command messages are issued by an operator in the lead locomotive and supplied to the remote locomotives over a radio frequency communications system, (such as the prior art LOCOTROL® distributed power communications system, available from the General Electric Company of Schenectady, New York) comprising a radio frequency link (channel) and receiving and transmitting equipment at the lead and the remote units. The receiving remote locomotives respond to these commands to apply tractive effort or braking effort to the train, and advise the lead unit of the receipt and execution of the command. The lead unit also sends other messages to the remote units, including status request messages. The remote units respond by sending a status reply message back to the lead unit.

In a train having two or more directly coupled remote locomotives, the coupled locomotives function in unison via control signals transmitted over their connected MU (multiple unit) lines. One of the locomotives is designated as a controlling remote unit with respect to the distributed power communications system. Only the controlling remote unit is configured to receive commands transmitted by the lead unit and respond to the lead unit with appropriate reply messages.

One of the most critical aspects of train operation is the predictable and successful operation of the air brake system. The air brake system comprises locomotive brakes in each locomotive (including the lead locomotive and all the remote locomotives) and car brakes at each railcar. The lead unit locomotive brakes are controlled by the locomotive operator in response to a position of a locomotive brake handle, and the rail car brakes are controlled in response to a position of an automatic brake handle. The locomotive brakes can also be controlled by the automatic brake handle.

The automatic brake handle or controller controls a pressure in a fluid carrying brake pipe that extends the length of the train and is in fluid communication with a car brake system for applying or releasing car brakes at each railcar in response to a pressure change in the brake pipe. Specifically, a control valve (typically comprising a plurality of valves and interconnecting piping) at each railcar responds to changes in the brake pipe fluid pressure by applying the brakes (in response to a decrease in the brake pipe fluid pressure) or by releasing the brakes (in response to an increase in the brake pipe fluid pressure). The fluid within the brake pipe conventionally comprises pressurized air. Operator control of the automatic brake handle in the lead locomotive initiates a pressure drop at the lead unit that propagates along the brake pipe to the end of the train. The control valve at each railcar senses the pressure drop and in response thereto supplies pressurized air from a local railcar reservoir to wheel brake cylinders that in turn draw brake shoes against railcar wheels. The railcar reservoir is recharged by air withdrawn from the brake pipe during non-braking operational intervals.

A brake release is also commanded by the lead operator by controlling the automatic brake handle to effect a pressure increase in the brake pipe. The pressure increase is sensed at the railcars and in response the brake shoes are released from the railcar wheels.

In a distributed power train, in addition to regulating the brake pipe pressure to effect application and release of the railcar brakes, the lead unit commands remote unit brake applications and releases by sending an appropriate signal to the remote units via the communications channel. As described further below, brake applications and releases are thus more rapidly affected along the length of the train due to the participation of both the lead unit and the remote units. With some limitations as required to maintain train control, in a distributed power train a brake command or brake release can also be commanded by the lead or the remote locomotives.

The railcar brakes can be applied in two modes, i.e., a service brake application or an emergency brake application. In a service brake application, braking forces are applied to the railcar to slow or bring the train to a stop at a forward location along the track. During service brake applications the brake pipe pressure is slowly reduced and the brakes are applied gradually in response thereto. The operator controls the rate at which the pressure is reduced by operation of the automatic brake control handle. A penalty brake application is one form of a service brake application in which the brake pipe is reduced to zero pressure, but the evacuation occurs at a predetermined rate, unlike an emergency brake application as described below, and the railcars do not vent the brake pipe during the penalty brake application.

An emergency brake application commands an immediate application of the railcar brakes through an immediate evacuation or venting of the brake pipe at the lead unit (and the remote units of a distributed power train). When a railcar senses a predetermined pressure reduction rate indicative of an emergency brake application, the railcar also vents the brake pipe to accelerate propagation of brake pipe evacuation along the train. Unfortunately, because the brake pipe runs for several thousand yards through the train, the emergency brake application does not occur instantaneously along the entire length of the brake pipe. Thus the braking forces are not uniformly applied at each railcar to stop the train.

On distributed power trains, braking is accomplished by venting the brake pipe at both the lead and remote locomotives, thus accelerating the brake pipe venting and application of the brakes at each railcar, especially for those railcars near the end of the train. As can be appreciated, brake pipe venting at only the lead unit in a conventional train requires propagation of the brake pipe pressure reduction along the length of the train, thus slowing brake applications at railcars distant from the lead unit. For a distributed power train with an operative communications link between the lead and remote units, when the train operator commands a brake application (e.g., a service or an emergency brake application) by operation of the automatic brake control handle at the lead unit, the brake pipe is vented and a brake application command is transmitted to each remote unit over the radio frequency communications link. In response, each remote unit also vents the brake pipe. Thus braking action at the remote locomotives follows the braking action of the lead unit in response to signals transmitted by the communications system.

A brake release initiated at the lead unit is also communicated over the radio frequency link to the remote units so that the brake pipe is recharged to a nominal pressure from all locomotives, reducing the brake pipe recharge time.

If an emergency brake application is initiated at the lead locomotive by the train operator or in response to a detected failure condition, the radio frequency communication system sends an emergency brake signal to each of the remote locomotives over the radio frequency link. In response, the remote locomotives evacuate the brake pipe. This technique permits faster execution of the emergency brake application since the brake pipe is evacuated from all of the locomotives, rather than from only the lead locomotive as in a conventional train.

FIGS. 1 and 2 schematically illustrate an exemplary distributed power train 10, traveling in a direction indicated by an arrowhead 11, wherein one or more remote units 12A-12C are controlled from either a lead unit 14 (FIG. 1) or a control tower 16 (FIG. 2). A locomotive 15 is controlled by the lead unit 14 via an MU line 17 connecting the two units. The teachings of the present invention can be applied to the distributed power train 10 and a communications system operative therewith as described below.

It should be understood that the only difference between the systems of FIGS. 1 and 2 is that the issuance of commands and messages from the lead unit 14 of FIG. 1 is replaced by the control tower 16 of FIG. 2 and certain interlocks of the system of FIG. 1 are eliminated. Typically, the control tower 16 communicates with the lead unit 14, which in turn is linked to the remote units 12A-12C.

In one embodiment, a communications channel of the communications system comprises a single half-duplex communications channel having a three kHz bandwidth, where the messages and commands comprise a serial binary data stream encoded using frequency shift keying modulation on one of four available carrier frequencies. The various bit positions convey information regarding the type of transmission (e.g., message, command, alarm), the substantive message, command or alarm, the address of the receiving unit, the address of the sending unit, conventional start and stop bits and error detection/correction bits. The details of the messages and commands provided by the system and the transmission format of individual messages and commands are discussed in detail in commonly owned U.S. Pat. No. 4,582,280, which is hereby incorporated by reference.

The distributed power train 10 of FIGS. 1 and 2, further comprises a plurality of railcars 20 interposed between the remote units 12A/12B and between the remote unit 12C (of FIG. 1). The arrangement of the locomotives 14 and 12A-12C and railcars 20 illustrated in FIGS. 1 and 2 is merely exemplary, as the present invention can be applied to other locomotive/railcar arrangements. The railcars 20 are provided with an air brake system (not shown in FIGS. 1 and 2) that applies the railcar air brakes in response to a pressure drop in a brake pipe 22, and releases the air brakes upon a pressure rise in the brake pipe 22. The brake pipe 22 runs the length of the train for conveying the air pressure changes specified by the individual air brake controls 24 in the lead unit 14 and the remote units 12A, 12B and 12C.

In certain applications, an off board repeater 26, further described below, is disposed within radio communication distance of the train 10 for relaying communications signals between the lead unit 14 and the remote units 12A, 12B and 12C.

The lead unit 14, the remote units 12A, 12B and 12C, the off board repeater 26 and the control tower 16 are provided with a transceiver 28 operative with an antenna 29 for receiving and transmitting communications signals over the communications channel.

The lead unit transceiver 28 is associated with a lead station 30 for generating and issuing commands and messages from the lead unit 14 to the remote units 12A-12C, and receiving reply messages therefrom.

Commands are generated in the lead station 30 in response to operator control of the motive power and braking controls within the lead unit 14, as described above, or automatically as required. Each remote unit 12A-12C and the off board repeater 26 comprises a remote station 32 for processing and responding to transmissions from the lead unit 14 and for issuing reply messages and commands.

The four primary types of radio transmissions carried by the communications system include: (1) link messages from the lead unit 14 to each of the remote units 12A-12C that "link" the lead unit 14 and the remote units 12A-12C, i.e., configure or set-up the communications system for use by the lead unit 14 and the remote units 12A-12C, (2) link reply messages that indicate reception and execution of the link message, (3) commands from the lead unit 14 that control one or more functions (e.g., application of motive power or braking) of one or more remote units 12A-12C and (4) status and alarm messages transmitted by the one or more remote units 12A-12C that update or provide the lead unit 14 with necessary operating information concerning the one or more remote units 12A-12C.

Each message and command sent from the lead unit 14 is broadcast to all of the remote units 12A-12C and includes a lead unit identifier for use by the remote units 12A-12C for determining that the sending lead unit is the lead unit of the same train. An affirmative determination causes the remote unit 12A-12C to execute the received command.

Messages and alarms sent from one of the remote units 12A-12C also include the sending unit's address. As a result of a previously completed link-up process, the receiving unit, i.e., the lead or another remote locomotive, can determine whether it was an intended recipient of the received transmission by checking the sending unit's identification in the message, and can respond accordingly.

These four message types, including the address information included in each, ensure a secure transmission link that has a low probability of disruption from interfering signals within radio transmission distance of the train 10. The messages allow for control of the remote units 12A-12C from the lead unit 14 and provides remote unit operating information to the lead unit 14.

Although most commands are issued by the lead unit 14 and transmitted to the remote units 12A-12C for execution as described above, there is one situation where a remote 12A-12C issues commands to the other remote units and the lead unit 14. If a remote unit 12A-12C detects a condition that warrants an emergency brake application, the remote transmits an emergency brake command to all other units of the train. The command includes identification of the lead locomotive of the train and will therefore be executed at each remote unit, as if the command had been issued by the lead unit.

Throughout the description of the present invention, the terms "radio link", "RF link" and "RF communications" and similar terms describe a method of communicating between two links in a network. It should be understood that the communications link between nodes (locomotives) in the system in accordance with the present invention is not limited to radio or RF systems or the like and is meant to cover all techniques by which messages may be delivered from one node to another or to plural others, including without limitation, magnetic systems, acoustic systems, and optical systems. Likewise, the system of the present invention is described in connection with an embodiment in which radio (RF) links are used between nodes and in which the various components are compatible with such links; however, this description of the presently preferred embodiment is not intended to limit the invention to that particular embodiment.

In a distributed power train, responsive to an operator-initiated command, the communications system at the lead unit transmits to each remote unit a radio frequency (RF) message representing the command. Such commands can include locomotive throttle or traction commands and air brake, dynamic brake and electric brake commands. In the case of an air brake command, upon message receipt, the brake command is executed at each remote unit to accelerate command response at the railcars, since the remote units receive the radio frequency message before they sense the brake pipe pressure change. For example, if the operator commands a brake application, the brake pipe is vented at the lead unit and the pressure reduction propagates along the length of the train until reaching the end-of-train car. Depending on train length, several seconds may elapse before the pressure reduction reaches the last railcar. Venting the brake pipe at the lead and remote locomotives, the latter in response to the RF message, accelerates the brake pipe venting and application of the brakes at each railcar, especially for the railcars near the end of the train. Thus braking actions at the remote locomotives follow the braking actions of the lead unit in response to the RF signals transmitted by the communications system.

A brake release initiated at the lead unit is also communicated over the radio frequency link to the remote units so that the brake pipe is recharged to its nominal pressure from all locomotives, reducing brake pipe recharge time.

If the train operator initiates an emergency brake application at the lead locomotive, the communication system sends an emergency brake signal to each of the remote locomotives over the radio frequency link. The remote locomotives evacuate the brake pipe to provide faster execution of the emergency brake application since the brake pipe is evacuated from all of the locomotives, rather than from only the lead locomotive as in a conventional train.

In general, messages sent over the communications system permit the application of more even tractive forces to the railcars and improve braking performance as each locomotive can effect a brake application at the speed of the RF signal, rather than the slower speed at which the pneumatic brake pipe braking signal propagates along the train.

When the distributed power train is operating in an environment where each remote unit is expected to receive command messages sent by the lead unit, for example when the train is traveling along a relatively straight length of track with no proximate obstructions to a radio frequency signal, the communications system is operative in a normal mode. In this mode, no communications losses, interruptions or repeated messages (because the message did not reach its intended destination when first transmitted) are anticipated. Most messages issued in the normal mode are controlled according to a fixed priority message protocol, according to which each remote unit transmits a status message responsive to a lead-issued command message after a predetermined interval from transmission of the command. Thus each remote unit is assigned a time slot, measured from transmission of the lead unit command message, during which each remote unit transmits its message.

A timing diagram of FIG. 3, where the system is described for a railroad train comprising a lead unit and four remote units, illustrates the concepts associated with the fixed priority message protocol for normal communications. The concepts described in conjunction with FIG. 3 can be applied to a train comprising more or fewer than four remote locomotives.

According to this scheme, at a time t=650 msec, the lead unit transmits a command message (for example, a brake command, a traction command, a dynamic brake command, etc.) that is expected to be received by all remote locomotives in the distributed power train. As can be seen in FIG. 3, each transceiver (radio) is allocated a 30 msec interval to turn on, and an exemplary command message length is 193 msec. After a lapse of the predefined interval from the lead transmission, for example 50 msec as indicated in FIG. 3, a first remote locomotive retransmits the command message and its status message (for example, the first remote locomotive is venting the brake pipe in response to the brake command). The status message is intended for the lead locomotive so that the train operator is advised of the first remote unit's response to the command. Also note that each remote unit retransmits the command message with its status message to maximize the likelihood that the command is received by all remote locomotives. The turn-on time, message duration, etc. illustrated in FIG. 3 are merely exemplary and can vary depending on the application and specifications of the components that comprise the communications system.

The second remote locomotive repeats the command message and transmits its status message after a predetermined delay, for example 50 msec, from the end of the first remote's transmission. The command repeating and status transmitting process continues until all remote locomotives have repeated the command message and transmitted their respective status message. An end of message condition occurs when the last remote has transmitted its status, after which the lead unit is free to transmit another command message to the remote locomotives. In the FIG. 3 embodiment, the end of message occurs at t=2896 msec or 2271 msec after the lead unit's initial transmission.

When the lead unit transmits a command message, the lead unit will not know whether the message was received by all the remote units in the train until a remote status message is received from each remote unit (wherein the status messages indicates receipt and execution of the command message) or a status message is not received from one or more of the remote units (lack of a status message indicates the command message was not received). Thus according to one embodiment of the communications system, to ensure that each remote unit receives the command messages, it is repeated by each remote unit.

Note that it is possible that one or more remote status messages may not be received by the lead unit. When this is the case, the lead unit retransmits the command message and awaits a reply status message from each remote unit in the train. One feature of the present invention, to be described below, increases the likelihood that all status messages are received at the lead unit, thus reducing the retransmit probability, without significantly impacting the overall transmission timing for the command and status messages.

In addition to the fixed priority protocol described above, certain commands, e.g., an emergency brake application, are classified as high priority command messages and are transmitted according to a different priority protocol than the fixed priority protocol. Still other command messages, e.g., a communications system check, operate according to other priority protocols that control transmission of these commands and the reply by the remote units.

As the distributed power train passes through certain terrain topographies or track segments with proximate natural or man-made obstructions, a line-of-sight communications link between the sending and the receiving units may be interrupted. Thus commands and status messages may not be reliably received by the receiving unit, i.e., the lead locomotive for messages sent from a remote unit, and a remote locomotive for messages sent from the lead unit. Although high-power, robust transceivers may be capable of successfully transmitting the signal to the receiving unit under certain operating conditions, such equipment can be relatively expensive. Further, in some operating scenarios even a high-power transceiver cannot successfully effect communications, such as when a long train travels a curved track segment adjacent a natural obstruction such as a mountain, where the communications path between the lead unit and one or more remote units is obstructed by the mountain. Also, as the train passes through a tunnel certain transceivers may be unable to communicate with other transceivers aboard the locomotives.

To improve system reliability, one embodiment of the distributed power train communications system comprises the off-board repeater 26 (see FIG. 1) for receiving messages sent from the lead unit 14 and repeating (retransmitting) the message for receiving by the remote units 12A-12C. This embodiment may be practiced along a length of track that passes through a tunnel, for example. In such an embodiment the off-board repeater 26 comprises an antenna 29 (e.g., leaky coaxial cable mounted along the tunnel length) and the remote station 32 for receiving and retransmitting lead messages that are received by all the remote units 12A-12C within RF communications range of the repeater antenna 29.

BRIEF SUMMARY OF THE INVENTION

According to one embodiment, the present invention comprises a communications method for a railroad train comprising a lead locomotive and remote locomotives. The method further comprises transmitting an outbound message from the lead locomotive, for each remote locomotive, receiving the outbound message from the lead locomotive or from another remote locomotive and transmitting the outbound message until the outbound message has been received by a last remote locomotive, at the last remote locomotive, transmitting an inbound message responsive to the outbound message and for each remote locomotive except the last remote locomotive, receiving the inbound message from another remote locomotive, appending a local status message and transmitting a modified inbound message until the modified inbound message has been received by the lead locomotive.

According to another embodiment, the present invention comprises a communications system for a railroad train having a lead locomotive and remote locomotives. The communications system further comprises a communications channel, a radio in the lead locomotive for transmitting an outbound message over the communications channel for receiving by the remote locomotives, a radio in each remote locomotive for receiving the outbound message and transmitting the outbound message over the communications channel for receiving by remote locomotives more distant from the lead locomotive, wherein the radio in each remote locomotive may not receive the outbound message, a radio in a last remote locomotive for receiving the outbound message from the lead locomotive or from another remote locomotive and for transmitting an inbound message in response to the outbound message over the communications channel for receiving by remote locomotives closer to the lead locomotive and for receiving by the lead locomotive, wherein the radio in the lead locomotive and the radio in each remote locomotive may not receive the inbound message and wherein the radio in each remote locomotive receiving the inbound message appends a local status message thereto to form a modified inbound message and transmits the modified inbound message over the communications channel for receiving by another remote locomotive or by the lead locomotive.

BRIEF DESCRIPTION OF THE DRAWINGS

The present invention can be more easily understood and the further advantages and uses thereof more readily apparent, when considered in view of the following detailed description when read in conjunction with the following figures, wherein:

FIGS. 1 and 2 are schematic illustrations of a distributed power train to which the teachings of the present invention can be applied.

FIG. 5 is a table illustrating timing parameters for the onboard message priority protocol according to the teachings of the present invention.

FIG. 9 is a table illustrating timing parameter comparisons for the normal priority message protocol, the onboard repeater message priority protocol and the off-board repeater message priority protocol.

In accordance with common practice, the various described features are not drawn to scale, but are drawn to emphasize specific features relevant to the invention. Reference characters denote like elements throughout the figures and text.

DETAILED DESCRIPTION OF THE INVENTION

Figure 3:
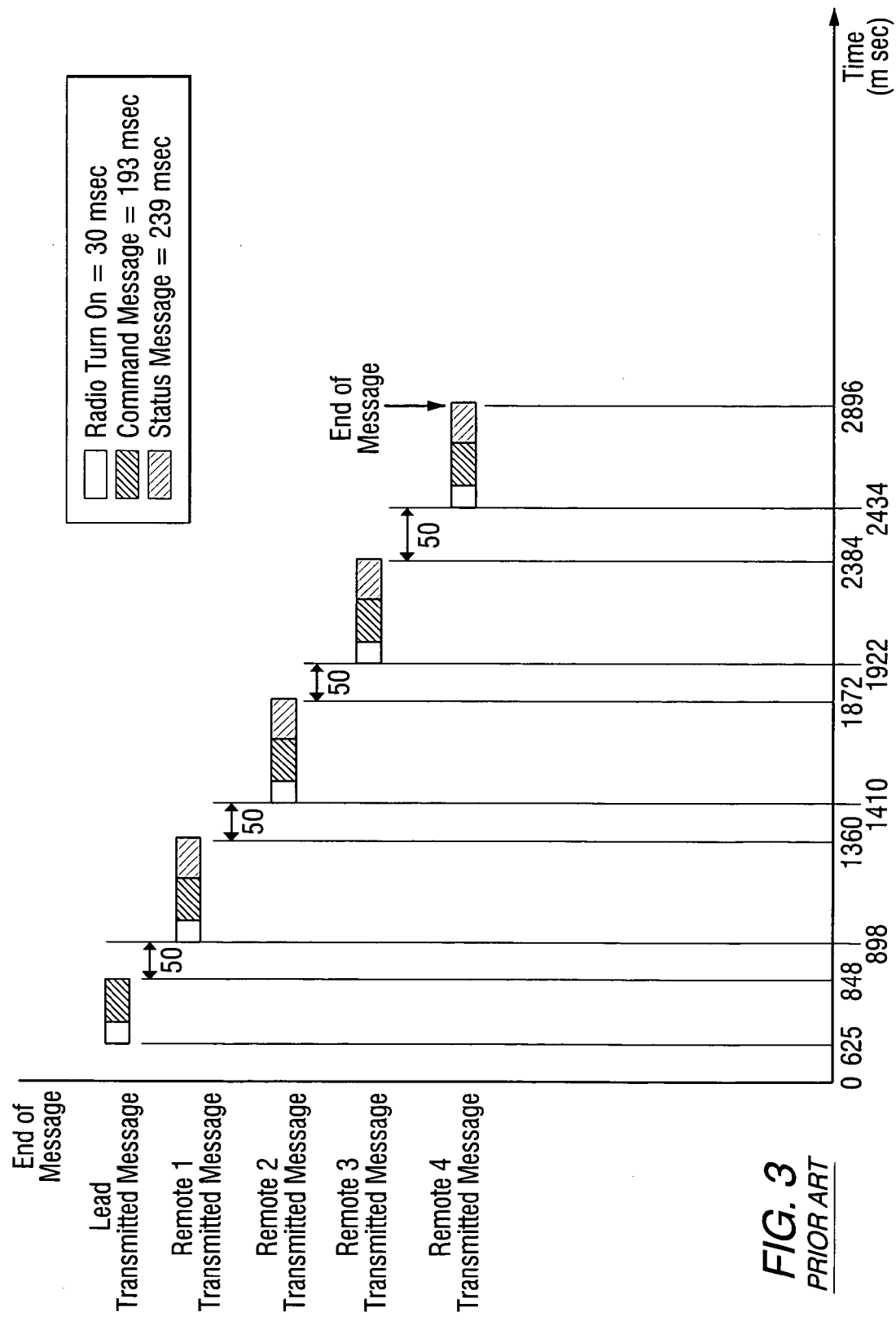
FIG. 3 is a timing diagram of a prior art normal message priority protocol for a communications system.

Before describing in detail the particular method and apparatus for a priority message protocol for an on-board message repeater system in accordance with the present invention, it should be observed that the present invention resides primarily in a novel combination of hardware and software elements related to said method and apparatus. Accordingly, the hardware and software elements have been represented by conventional elements in the drawings, showing only those specific details that are pertinent to the present invention, so as not to obscure the disclosure with structural details that will be readily apparent to those skilled in the art having the benefit of the description herein.

According to a preferred embodiment of the present invention, comprising a priority message protocol for an on-board message repeater system in a distributed power train, such as the distributed power train 10 of FIG. 1, messages transmitted from the lead unit 14 leapfrog down the train from the head end to the end-of-train as each successive remote unit 12A-12C receives and retransmits the message.

Further, when the train enters an environment where the lead locomotive unit may not successfully communicate directly with each remote unit (for example, when the train enters a tunnel), the communications system may automatically switch to the priority protocol for on-board message repeating (OBMR) according to the teachings of the present invention. Such a switch occurs, for example, when the communications system experiences an interrupt of more than a predetermined fixed duration, one minute for example. Once activated, in one embodiment the OBMR protocol is active for fifteen minutes, after which the communications system returns to normal priority message protocol operation, i.e., as described in conjunction with FIG. 3. In another embodiment, the communications system can be configured for continual OBMR operation or OBMR operation can be manually activated by the lead locomotive operator.

Figure 4:
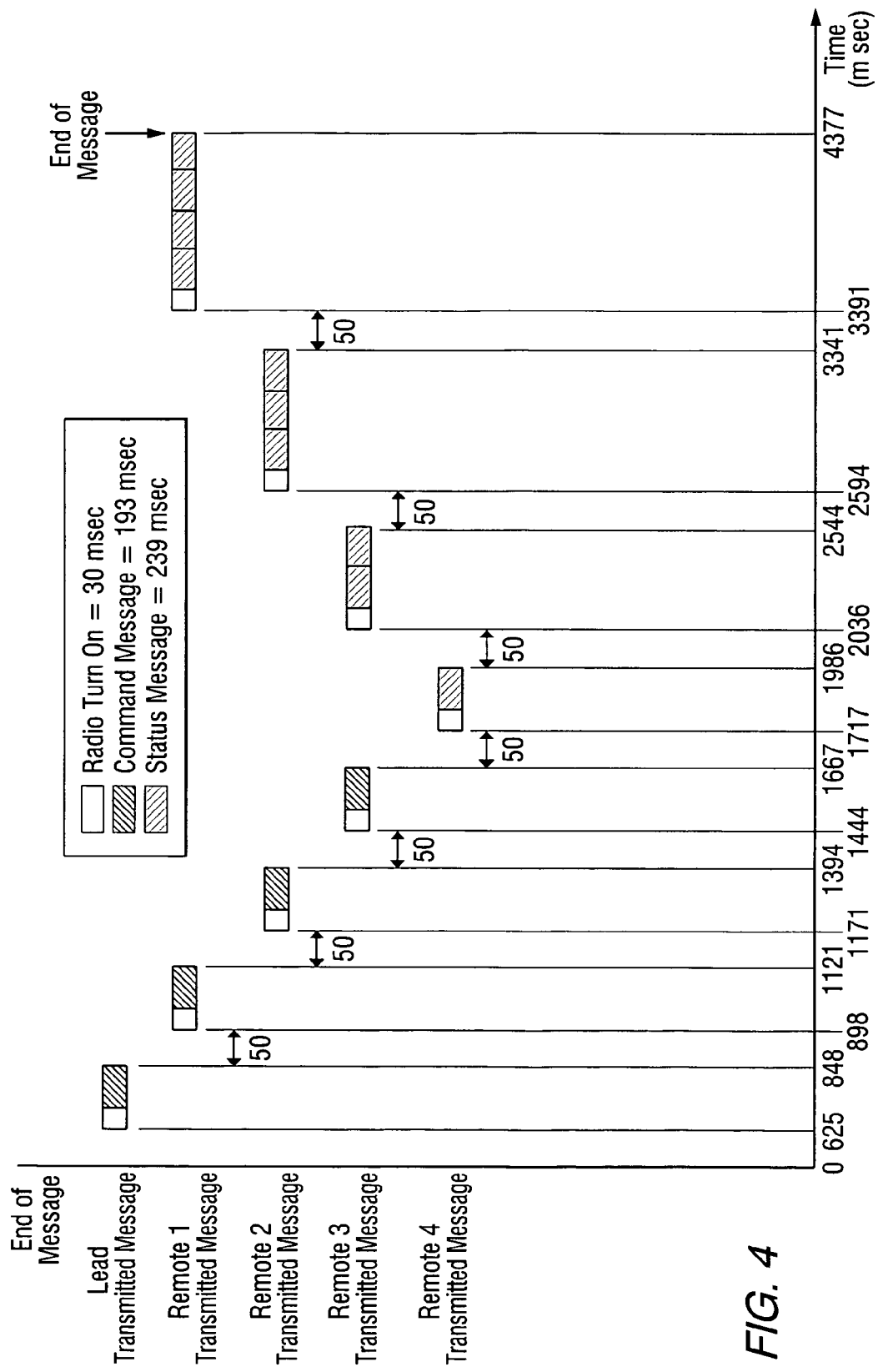
FIG. 4 is a timing diagram of an onboard message priority protocol, according to the teachings of the present invention, for use with a train comprising four remote units.

FIG. 4 illustrates an exemplary OBMR protocol for a train comprising a lead unit and four remote units. In this mode, the lead unit transmits a command message (i.e., a message that commands a new function at the remote units or a status update message that requests remote unit status information and also includes the most recent previously-transmitted command). The first remote unit receives the outbound command message and repeats the message for receiving by other remote units in the train.

As illustrated in FIG. 4, the lead unit transmission begins at 625 msec after a time t=0. This interval is merely exemplary and represents a predetermined minimum interval between receipt of a message at the lead unit and a transmission of a later command from the lead unit. Note the exemplary 50 msec delay interval between the end of a message transmission and retransmission of the message, and also the allotted exemplary 30 msec radio (transceiver) turn-on time. Generally, the command messages sent by the lead unit, the messages sent by the remote units and the interval between message transmissions are fixed in length. However, these lengths may vary as needed for a particular application of the present invention and may differ among different railroad operators.

Unlike the normal communications mode described above, the first remote does not transmit a return status message upon receipt of the outbound message. Instead, the first remote unit (and each subsequent remote unit) repeats the outbound message, thereby permitting the outbound message to propagate along the length of the train, without incurring the time penalty of the status messages transmissions from each remote unit. As can be seen from FIG. 4, each remote unit retransmits the outbound message within its respective predefined time slot. Thus the message leapfrogs down the train for receiving by each remote unit. At this point, no status messages have been returned to the lead locomotive.

When the last remote (the nth remote) receives the command message, the last remote sends its status message (i.e., an inbound message) back to the previous (n-1)th remote. According to standard practice, when the communications system is configured or the lead and remote units are linked, the remote unit farthest from the lead unit is configured as the last remote, i.e., the last remote "knows" that it is the last remote in the train. Thus when the last remote unit receives the outbound message it responds with its status message. Remote unit three (in the case where n=4) receives the status message from remote unit four and stores the received status message until its designated time slot, at which time remote unit three repeats the remote unit four status message and appends its own status message, transmitting both status messages in a direction of the lead unit, i.e., to the second remote. Remote unit two receives the status messages from remote units four and three, and transmits these status messages, plus its own status message, in the direction of the lead unit. The process continues until each remote unit's status message reaches the lead unit as a concatenated message comprising the status message from each remote unit.

As can be seen from FIG. 4, this occurs at t=4377 msec, or a total elapsed time of 3752 msec from the start of transmission of the outbound command message to receipt of all status messages at the lead unit.

According to standard operation procedure of the distributed power train communications system, in the event that a remote unit did not receive the outbound message as it was originally transmitted from the lead unit or as the message was successively repeated by the remote units, a non-receiving remote unit will not have a status message to report back to the lead unit. The lead unit expects a status message from each of the remote units and can determine from the received status messages (each remote unit status message includes a remote unit identifier) which if any of the remote units did not receive the command message. Thus if the lead unit does not receive a status message from one or more remotes, the command is retransmitted by the lead unit. According to one embodiment, the lead operator is informed of this remote unit miss by an appropriate indication on a lead unit display.

As can be appreciated by those skilled in the art, a status message transmitted by a remote unit may be received by remote units in addition to the intended receiving remote unit, i.e., where the intended receiving remote unit is that remote unit adjacent to the transmitting remote unit in a direction toward the lead unit of the train. For example, in the FIG. 4 distributed power train having four remote units, both remote units two and three may receive the status message transmitted by the remote unit four. Remote unit two stores the remote four status message until its designated time slot, and may receive the remote four status message a second time when retransmitted by remote unit three. The capability of multiple receptions of a status message improves the probability that the lead unit receives the status message from each remote unit that received the command message.

Recall that this operational mode assumes, for the sake of providing reliable systems operation, that the remote units can effectively communicate with only the adjacent remote. However, this limitation is not a prerequisite for operating a distributed power train in this mode.

FIG. 5 is a table indicating the relative transmission times and message content for the message priority protocol for on-board message repeating for a train comprising one lead locomotive and four remote locomotives as illustrated in FIG. 4.

The time delay column of FIG. 5 indicates the time delay between the end of one transmission and a beginning of another transmission, e.g., 50 msec in the illustrated embodiment between the end of a first remote unit transmission and the beginning of a second remote unit transmission. However, the 50 msec interval is a sliding interval, that is, whenever a remote unit transmits a signal, the next remote waits 50 msec from the end of the transmission before initiating its transmission. If a remote unit does not transmit a signal then each subsequently transmitting remote unit subtracts 50 msec from its transmit time. The time delay column is the amount of time delay that each remote unit delays before transmitting if all of the previous remote units did not transmit. For example, if remote unit one did not transmit in its assigned time slot, then remote unit two transmits at 100 msec after the end of the lead unit transmission. Remote unit three transmits 50 msec after the end of the remote unit two transmission.

Figure 6:
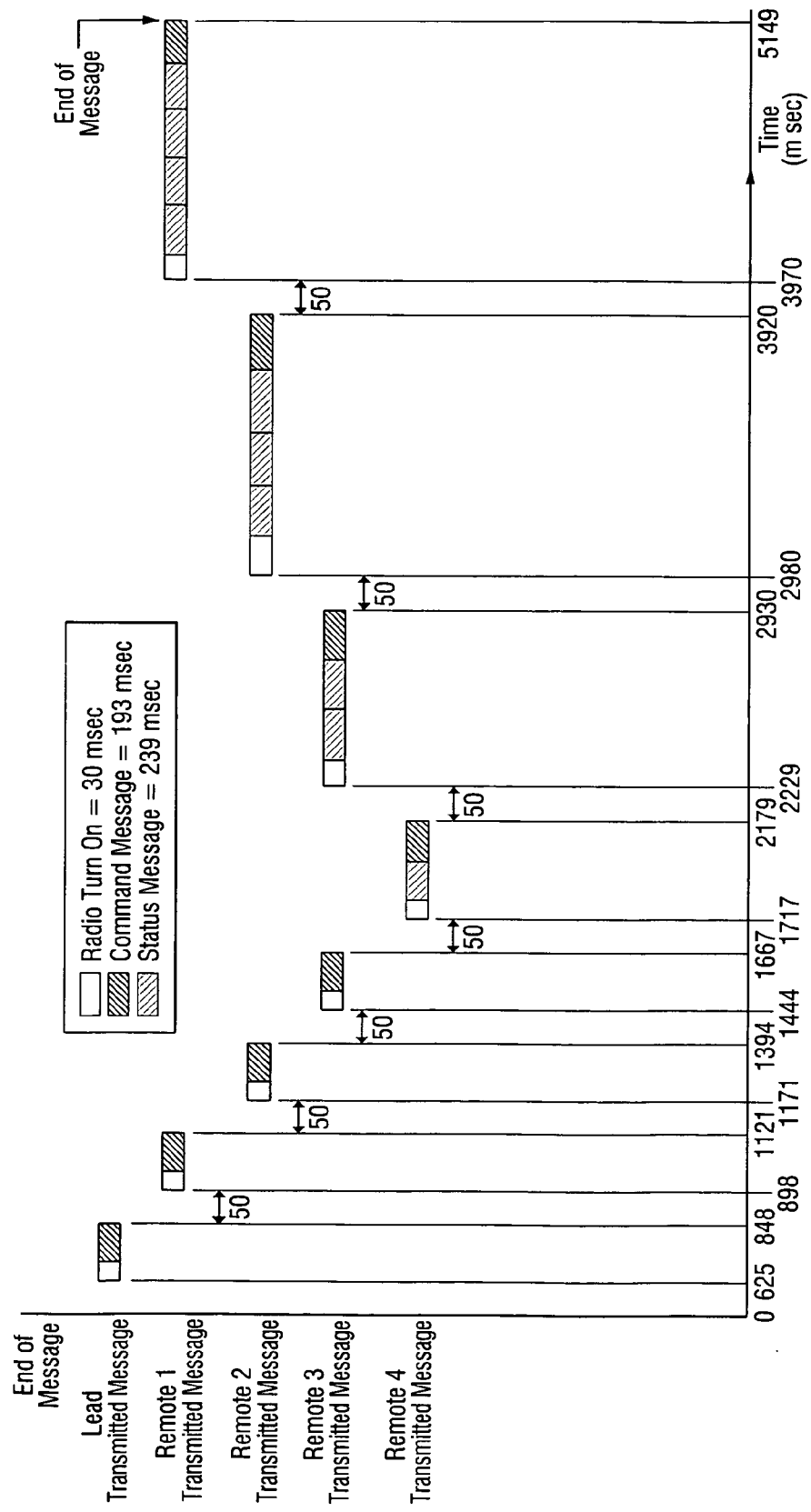
FIG. 6 is a timing diagram of another embodiment of an onboard message priority protocol, according to the teachings of the invention, for use with a train comprising four remote units.

According to a variant of the OBMR protocol described in conjunction with FIGS. 4 and 5, during the period when status messages are transmitted by the remote units in the direction of the lead unit, the outbound command message is also transmitted by the remote units to maximize the opportunity for each remote unit to receive the command message. This scenario, which is illustrated in FIG. 6, extends the time between transmission of the command message from the lead unit and receipt of the remote status messages at the lead unit, with the benefit of increasing the probability that each remote unit receives the outbound message.

Figure 7:
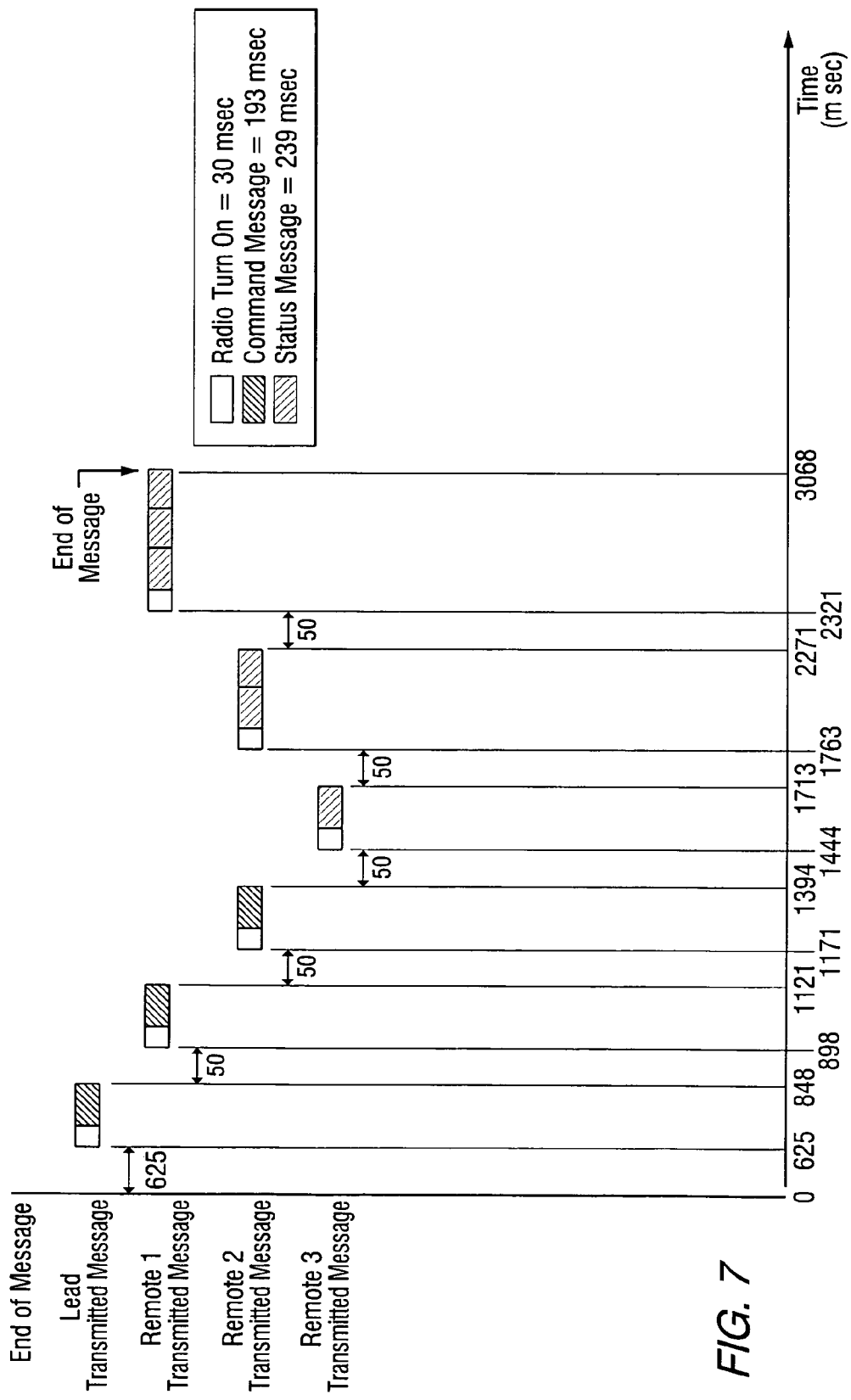
FIG. 7 is a timing diagram of an onboard message priority protocol, according to the teachings of the present invention, for use with a train comprising three remote units.

FIG. 7 is a timing diagram for the message priority protocol for on-board message repeater for a train comprising a lead locomotive and three remote locomotives. The implementation principles for a distributed power train comprising three remote units are identical to the implementation for a four remote unit distributed power train as described above in conjunction with FIG. 4. As can be appreciated by those skilled in the art, the embodiment illustrated in FIG. 6 wherein the remote units retransmit the command message can also be applied to a train comprising a lead unit and three remote locomotives (or a train comprising any number of remote units).

Figure 8:
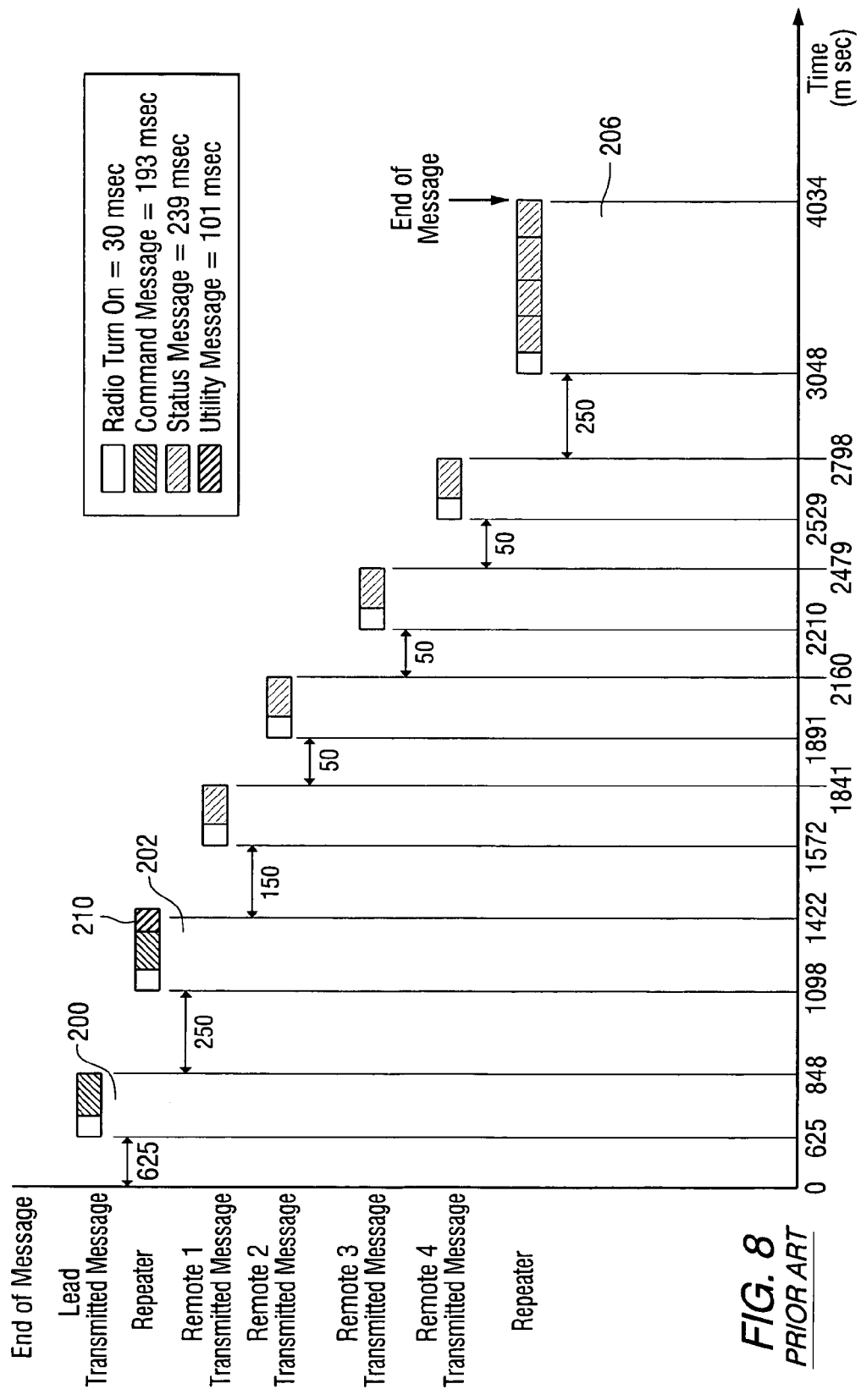
FIG. 8 is a timing diagram for an off-board message repeater system according to the teachings of the present invention.

FIG. 8 is a timing diagram for the normal communications timing protocol when operative with the off-board message repeater 26 described above in conjunction with FIG. 1. The lead unit transmits a command message during time interval 200 that is received and retransmitted by the message repeater 26 during time interval 202. Each of four remote units receives the repeated command message and responds with its status message during its allotted time slot. The repeater 26 receives all the remote unit status messages and retransmits them for receiving by the lead unit 14 during time interval 206, after which the message interval ends.

A utility message 210 referenced in FIG. 8 is a message sent by the repeater 26 to all lead units in radio range of the repeater 26, causing all receiving lead units to delay transmissions. For example, the utility message prevents a lead unit that is outside of a tunnel from transmitting simultaneously with a remote unit that is inside the tunnel.

FIG. 9 compares message delay times of the prior art normal message protocol, the OBMR protocol of the present invention, and the normal message timing protocol when operative with the off-board message repeater.

In other embodiments, the communications system of the present invention further comprises an antenna/radio diversity feature and/or a signal selection feature that are advantageous to overcome signal transmission path impairments such as caused by multi-path signal propagation, signal reflections and signal obstructions (such as due to a locomotive-mounted pantograph for supplying electrical power to the locomotive from overhead power cables).

Figure 10:
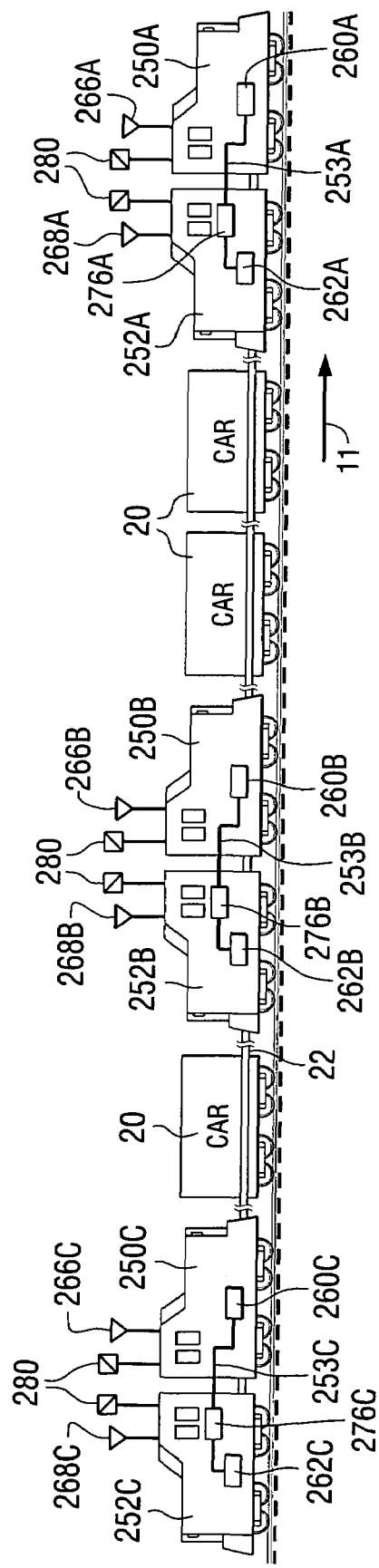
FIG. 10 is a schematic illustration of a distributed power train according to another embodiment of the present invention.

Each consist of two locomotives comprises a forward locomotive 250A/250B/250C and a rearward locomotive 252A/252B/252C (see FIG. 10), each locomotive further comprising a forward radio 260A/260B/260C and a rearward radio 262A/262B/262C, each forward radio operative in conjunction with an antenna 266A/266B/266C and each rearward radio operative in conjunction with an antenna 268A/268B/268C, respectively for receiving messages sent from other locomotives of a train 270. The consist locomotives are coupled by an MU (multiple unit) cable 253A/253B/253C. According to conventional railroad parlance, the forward locomotive 250A/250B/250C is designated the "A" unit controlling the locomotive 252A/252B/252C or "B" unit by control signals initiated by the train operator in the "A" unit and supplied to the "B" unit over the MU cable 253A/253B/253C.

When the communications system is activated, the forward radios 260A/260B/260C and the rearward radios 262A/262B/262C in each locomotive consist are activated. Thus both radios in each consist receive messages transmitted by other units in the train 270. Both the forward radios 260A/260B/260C and the rearward radios 262A/262B/262C determine a signal quality metric (such as the signal strength, bit error rate, or the reception of valid data) for each received message. The signal quality metrics are compared in a comparator/processor 276A/276B/276C, and the message having the better signal quality metric is selected as the operative message for use by the locomotives consist.

According to a preferred embodiment, the signal quality metric is determined for all messages received at the forward radios 260A/260B/260C and the rearward radios 262A/262B/262C to select the operative message for that consist. For example, each received radio message can be verified to be correct by subjecting the message to an error detection and correction algorithm, followed by processing according to the present invention to determine the signal quality metric of the signal received at each radio of the consist, from which the operative message for the consist is selected.

Alternatively, in lieu of processing the entire signal for determining the signal quality metric, only a first group of message bits are analyzed to determine the signal quality metric of the message. The message with the better signal quality metric is selected as the operative message for the consist.

Typically, outbound messages are transmitted from the antenna/radio 268A/262A of the lead consist and status messages are transmitted from the antennas/radios 266B/260B and 266C/260C of the remote consists. In yet another embodiment, to minimize interference that can disrupt accurate reception of received signals, one of the antennas 266A/266B/266C (and the corresponding radio 260A/20B/260C) or one of the antenna 268A/268B/268C (and the corresponding radio 262A/262B/262C) is selected as the transmitting antenna in response to a desired direction for the transmitted signal. Note that the antennas 266A/266B/266C are disposed proximate a forward end of the associated locomotive consist (assuming a direction of travel indicated by the arrowhead 11) and the antennas 268A/268B/268C are disposed at a rearward end of the associated locomotive consist.

The radio 260A/260B/260C/262A/262B/262C determines an intended direction for the transmitted signal (e.g., inbound or outbound based on the type of signal and/or information contained in the signal) and selects the transmitting antenna/radio that is closest to the intended receiving antenna/radio. For example, if the locomotive consist comprising the locomotives 250A and 252A is the lead consist and it is desired to transmit an outbound message to the locomotive consist comprising the locomotives 250B and 252B, then the antenna/ radio 268A/262A is selected as the operative antenna. This feature can be especially beneficial when each locomotive comprises a pantograph 280 for supplying current to the locomotives from an overhead current source (not shown in FIG. 10). According to this embodiment, an antenna (and corresponding radio) is selected such that the desired signal direction is away from the pantograph. As a further example, if the remote locomotive consist comprising the locomotives 250B and 252B is to send a signal to the locomotive consist comprising the locomotives 250A and 252A, then the antenna/radio 266B/260B is selected as the operative antenna/radio.

Figure 11:
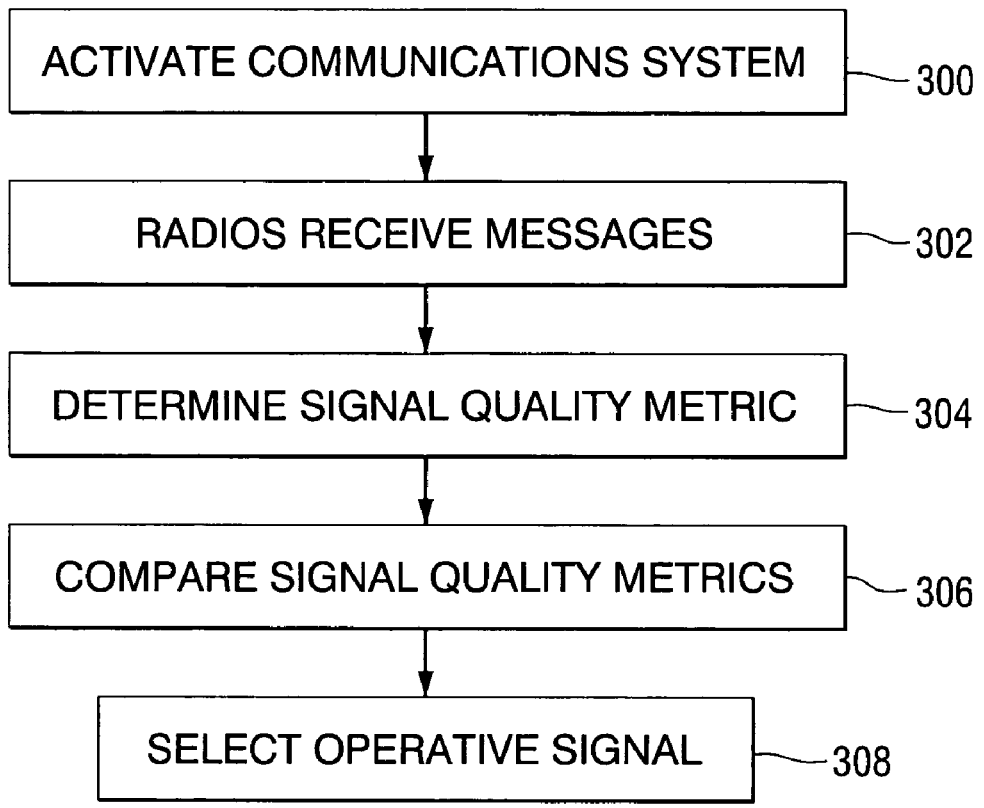
FIGS. 11 and 12 are flowcharts depicting processing steps according to two embodiments of the present invention.

FIG. 11 is a flow chart illustrating the method for implementing the signal selection function according to the teachings of the present invention. In one embodiment, the FIG. 11 method is implemented in a microprocessor and associated memory elements within the locomotives of the railroad train, for example, within the locomotives 260A/260B/260C/262A/262B/262C. In such an embodiment the FIG. 11 steps represent a program stored in the memory element and operable in the microprocessor. When implemented in a microprocessor, program code configures the microprocessor to create logical and arithmetic operations to process the flow chart steps. The invention may also be embodied in the form of computer program code written in any of the known computer languages containing instructions embodied in tangible media such as floppy diskettes, CD-ROM's, hard drives, DVD's, removable media or any other computer-readable storage medium. When the program code is loaded into and executed by a general purpose or a special purpose computer controlled by a microprocessor, the computer becomes an apparatus for practicing the invention. The invention can also be embodied in the form of a computer program code, for example, whether stored in a storage medium loaded into and/or executed by a computer or transmitted over a transmission medium, such as over electrical wiring or cabling, through fiber optics, or via electromagnetic radiation, wherein when the computer program code is loaded into and executed by a computer, the computer becomes an apparatus for practicing the invention.

The FIG. 11 flow chart begins at a step 300 where the communications system is activated, thus the forward radios (260A/260B/260C in FIG. 10) and the rearward radios (262A/262B/262C in FIG. 10) in each locomotive consist are activated. As indicated at a step 302, both radios in each consist receive messages transmitted by other units in the train 270. As indicated at a step 304, both the forward radios and the rearward radios determine a signal quality metric (such as the signal strength, bit error rate, or the reception of valid data) for each received message. The signal quality metrics are compared at a step 306 and the message having the better signal quality metric is selected (see a step 310) as the operative message for use by the locomotive consist.

Figure 12:
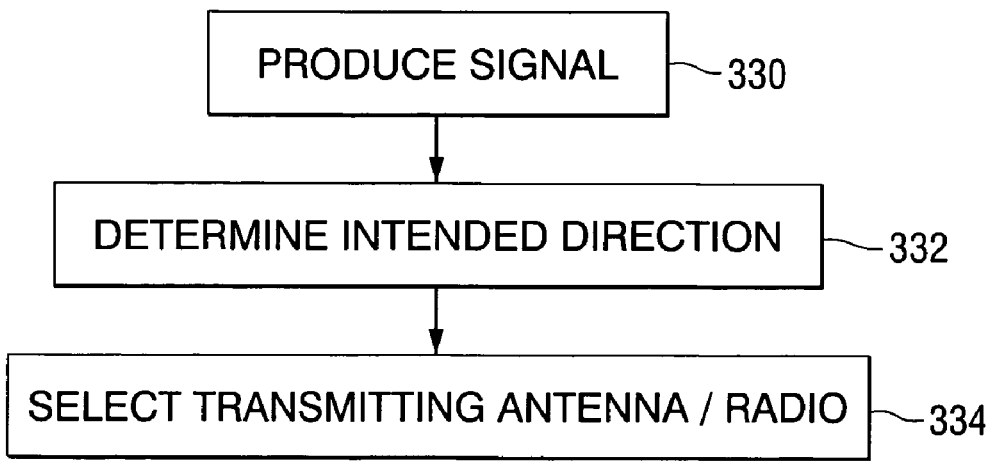

A flowchart of FIG. 12 depicts the antenna/radio diversity feature of one embodiment of the present invention. At a step 330 a signal is produced for transmitting to another locomotive in the train. At a step 332 an intended direction for the transmitted signal (e.g., inbound or outbound based on the type of signal and/or information contained of the signal) is determined. At a step 334, the transmitting antenna/radio is selected as the antenna/radio that is closest to the intended receiving antenna/radio.

While the invention has been described with reference to preferred embodiments, it will be understood by those skilled in the art that various changes may be made and equivalent elements may be substituted for elements thereof without departing from the scope of the present invention. The scope of the present invention further includes any combination of the elements from the various embodiments set forth herein. In addition, modifications may be made to adapt a particular situation to the teachings of the present invention without departing from its essential scope. Therefore, it is intended that the invention not be limited to the particular embodiment disclosed as the best mode contemplated for carrying out this invention, but that the invention will include all embodiments falling within the scope of the appended claims.

What is claimed is:

1. A communications method for a railroad train comprising a lead locomotive and at least two remote locomotives, the method comprising:

transmitting an outbound message from the lead locomotive for receiving by all remote locomotives that are within communications range of the lead locomotive;

at each remote locomotive that receives the outbound message, storing the outbound message, and transmitting the outbound message during an outbound time slot defined for the receiving remote locomotive, wherein each remote locomotive transmits the outbound message before transmitting an inbound message;

at a remote locomotive configured as the last locomotive, receiving the outbound message, and transmitting an inbound message comprising a response of the last remote locomotive to the outbound message;

at each remote locomotive that receives the inbound message, except the last remote locomotive, storing the inbound message, appending a local status message and transmitting a modified inbound message during an inbound time slot defined for the receiving locomotive, wherein the inbound message that reaches the lead locomotive comprises a response to the outbound message from each remote locomotive that received the outbound message;

at the lead locomotive, determining whether a reply was received from all remote locomotives, and in the event a reply was not received from one or more of the remote locomotives transmitting the outbound message again;

wherein the outbound time slots and the inbound time slots are responsive to a number of remote locomotives in the train and a time slot is assigned to each remote locomotive based on a position of the remote locomotive in the train; and wherein a beginning time of an outbound and an inbound time slot for a remote locomotive is modified if one or more other remote locomotives do not transmit an outbound message or do not transmit an inbound message.

2. The communications method of claim 1 wherein the outbound message comprises a command message or a status update request message.

3. The communications method of claim 1 wherein the response of the last locomotive to the outbound message comprises a status message indicating a status of the last remote locomotive, and wherein the response of each remote locomotive that received the outbound message comprises a status message indicating a status of the remote locomotive receiving the outbound message.

4. The communications method of claim 1 wherein the step of at each remote locomotive that receives the outbound message, further comprises receiving the outbound message from the lead locomotive or from another remote locomotive.

5. The communications method of claim 1 wherein the step of at each remote locomotive that receives the inbound message, except the last remote locomotive, further comprises receiving the inbound message from the remote locomotive configured as the last locomotive or from another remote locomotive.

6. The communications method of claim 1 further comprising receiving the modified inbound message at the lead locomotive, wherein the modified inbound message comprises a concatenated status message further comprising a local status message of each remote locomotive.

7. The communications method of claim 6 wherein the local status message of each remote locomotive further comprises an indication of the response at the respective remote locomotive to the outbound message.

8. A communications method for a railroad train comprising a lead locomotive and at least two remote locomotives, wherein the lead locomotive transmits standard outbound messages and priority outbound messages intended for at least one remote locomotive and the remote locomotives transmit an inbound status message intended for the lead locomotive, the method comprising:

for a standard outbound message:
    transmitting the outbound message from the lead locomotive;
    receiving the outbound message at one or more of the remote locomotives;
    at each remote locomotive receiving the outbound message, transmitting an inbound status message intended for the lead locomotive and retransmitting the outbound message, wherein the remote locomotives transmit the inbound status message and retransmits the outbound message in an order determined by a location of the remote locomotive relative to the lead locomotive, with a remote locomotive nearest the lead locomotive first transmitting the inbound status message and retransmitting the outbound message;

for a priority outbound message:
    transmitting the outbound message from the lead locomotive for receiving by all remote locomotives that are within communications range of the lead locomotive;
    receiving the outbound message at one or more of the remote locomotives;
    at each remote locomotive receiving the outbound message, storing the outbound message, and retransmitting the outbound message during an outbound timeslot defined for the receiving remote locomotive, wherein each remote locomotive transmits the outbound message before transmitting an inbound message;
    at the last remote locomotive, in response to receiving the outbound message, transmitting an inbound message responsive to the outbound message;
    at each remote locomotive receiving the inbound message, except the last remote locomotive, storing the inbound message, appending a local status message and transmitting a modified inbound message during an inbound timeslot defined for the receiving locomotive;
    receiving the modified inbound message at the lead locomotive, wherein the inbound message that reaches the lead locomotive comprises a response to the outbound message from each remote locomotive that received the outbound message;
    at the lead locomotive, determining whether a reply was received from all remote locomotives, and in the event a reply was not received from one or more of the remote locomotives transmitting the outbound message again;
    wherein the outbound time slots and the inbound time slots are responsive to a number of remote locomotives in the train and a time slot is assigned to each remote locomotive based on the position of the remote locomotive in the train; and
    wherein a beginning time of an outbound and an inbound time slot for a remote locomotive is modified if one or more other remote locomotives do not transmit an outbound message or do not transmit an inbound message.

9. The communications method of claim 8 wherein each remote locomotive retransmits the outbound message at a time determined by when another remote locomotive closer to the lead locomotive retransmitted the outbound message.

10. The communications method of claim 8 wherein each remote locomotive retransmits the modified inbound message at a time determined by when another remote locomotive farther from the lead locomotive transmitted the modified inbound message.

11. The communications method of claim 8 further comprising determining an operating condition of the train, and determining whether the outbound message comprises the standard outbound message or the priority outbound message in response to the operating condition.

12. The communications method of claim 11 wherein the step of determining the operating condition of the train further comprises determining that the lead locomotive can communicate with each of the remote locomotives and in response thereto the outbound message comprises the standard outbound message.

13. A communications method for a railroad train comprising a lead locomotive and at least two remote locomotives and a communications system over which the lead and the remote locomotives communicate, the method comprising:
    transmitting an outbound message from the lead locomotive for receiving by all remote locomotives;
    receiving the outbound message at receiving outbound locomotives of the one or more remote locomotives;
    storing the outbound message at the receiving outbound locomotives;
    transmitting the outbound message from the receiving outbound locomotives, in an order determined by increasing distance between the lead locomotive and the remote locomotive beginning with transmitting the remote locomotive having the shortest distance, and wherein each receiving outbound locomotive transmits the outbound message during an outbound time slot defined for the receiving outbound locomotive, wherein each remote locomotive transmits the outbound message before transmitting an inbound message;
    from the remote locomotive most distant from the lead locomotive, in response to receiving the outbound message, transmitting an inbound message;
    receiving the inbound message at receiving inbound locomotives of the one or more remote locomotives;
    transmitting a modified inbound message from the receiving inbound locomotives in an order determined by decreasing distance between the lead locomotive and the remote locomotive beginning with transmitting from the remote locomotive having the greatest distance, and wherein the modified inbound message comprises the modified inbound message as received plus a local status message of the receiving inbound locomotive appended thereto, and wherein each receiving inbound locomotive transmits the modified inbound message during an inbound timeslot defined for the receiving inbound locomotive;

at the lead locomotive, determining whether a reply was received from all remote locomotives, and in the event a reply was not received from one or more of the remote locomotives transmitting the outbound message again;

wherein the outbound time slots and the inbound time slots are responsive to a number of remote locomotives in the train and a time slot is assigned to each remote locomotive based on the position of the remote locomotive in the train; and wherein a beginning time of an outbound and an inbound time slot for a remote locomotive is modified if one or more other remote locomotives do not transmit an outbound message or do not transmit an inbound message.

14. A communications system for a railroad train having a lead locomotive and at least two remote locomotives, the communications system comprising:

a communications channel;

a radio in the lead locomotive for transmitting an outbound message over the communications channel for receiving by all of the remote locomotives that are within communications range of the lead locomotive;

a radio in each remote locomotive for receiving the outbound message, each remote locomotive receiving the outbound message storing the outbound message and transmitting the outbound message over the communications channel during an outbound time slot defined for the receiving locomotive, wherein each remote locomotive transmits the outbound message before transmitting an inbound message;

a radio in a last remote locomotive for receiving the outbound message and for transmitting an inbound message comprising a response of the last remote locomotive to the outbound message over the communications channel;

wherein the radio in each remote locomotive receiving the inbound message, except the last remote locomotive, stores the inbound message and appends a local status message thereto to form a modified inbound message and transmits the modified inbound message over the communications channel during an inbound time slot defined for the receiving locomotive, wherein the inbound status message that reaches the lead locomotive comprises a response to the outbound message from each remote locomotive that received the outbound message, the lead locomotive determining whether a reply was received from all remote locomotives, and in the event a reply was not received from one or more of the remote locomotives, transmitting the outbound message again;

wherein the outbound time slots and the inbound time slots are responsive to a number of remote locomotives in the train and a time slot is assigned to each remote locomotive based on a position of the remote locomotive in the train; and wherein a beginning time of an outbound and an inbound time slot for a remote locomotive is modified if one or more other remote locomotives do not transmit an outbound message or do not transmit an inbound message.

15. The communications system of claim 14 wherein the outbound message comprises a command message or a status update message.

16. The communications system of claim 14 wherein the inbound message comprises a status message indicating a status of the last remote locomotive, and wherein the local status message comprises a status message indicating a status of the remote locomotive appending the local status message.

17. The communications system of claim 14 wherein the modified inbound message comprises a concatenated status message further comprising the local status message of each remote locomotive that received the outbound message.

18. The communications system of claim 14 wherein the local status message of each remote locomotive further comprises an indication of a response at the respective remote locomotive to the outbound message.

\* \* \* \* \*